US006713895B1

(12) United States Patent
Krapfl

(10) Patent No.: US 6,713,895 B1
(45) Date of Patent: Mar. 30, 2004

(54) KEY FOB FOR VEHICULAR REMOTE KEYLESS ENTRY SYSTEMS

(75) Inventor: Clifford Krapfl, Pontiac, MI (US)

(73) Assignee: Lear Corporation, Southfield, MI (US)

(*) Notice: Subject to any disclaimer, the term of this patent is extended or adjusted under 35 U.S.C. 154(b) by 75 days.

(21) Appl. No.: 09/684,406

(22) Filed: Oct. 6, 2000

(51) Int. Cl.[7] .................................................. B60L 1/00
(52) U.S. Cl. ....................... 307/10.1; 307/9.1; 307/10.6
(58) Field of Search ........................... 70/458; 307/10.1, 307/9.1, 10.6; 340/5.25, 5.64

(56) References Cited

U.S. PATENT DOCUMENTS

| | | | | | |
|---|---|---|---|---|---|
| 3,782,150 | A | * | 1/1974 | Wolpin | 70/459 |
| 4,306,433 | A | * | 12/1981 | Kelly | 70/456 R |
| 4,601,185 | A | * | 7/1986 | Sheldon | 70/456 R |
| 4,771,897 | A | * | 9/1988 | Ho | 211/13 |
| 5,038,590 | A | * | 8/1991 | Sawyer et al. | 70/458 |
| 5,278,547 | A | * | 1/1994 | Suman et al. | 340/825.32 |
| 5,646,913 | A | * | 7/1997 | Quesenberry | 368/223 |
| 5,982,881 | A | * | 11/1999 | Mischenko | 379/433 |
| 6,000,258 | A | * | 12/1999 | Lesko | 70/460 |
| 6,016,676 | A | * | 1/2000 | McConnell | 70/408 |
| 6,089,060 | A | * | 7/2000 | Steeley | 70/456 R |
| 6,334,239 | B1 | * | 1/2002 | Kraut | 24/3.6 |
| 2001/0002003 | A1 | * | 5/2001 | Kuzdak et al. | 206/38.1 |
| 2001/0035811 | A1 | * | 11/2001 | Dewan | 340/5.25 |

* cited by examiner

*Primary Examiner*—Robert Deberandinis
(74) *Attorney, Agent, or Firm*—Bill C. Panagos

(57) ABSTRACT

A key fob for a vehicular remote keyless entry system includes a main body which houses electronics for activating the remote keyless entry system. The key fob further includes first and second components having different identifying indicia. The first and second components are releasably secured to the main body, such that they can be interchanged to function as visual or tactile identifiers.

9 Claims, 3 Drawing Sheets

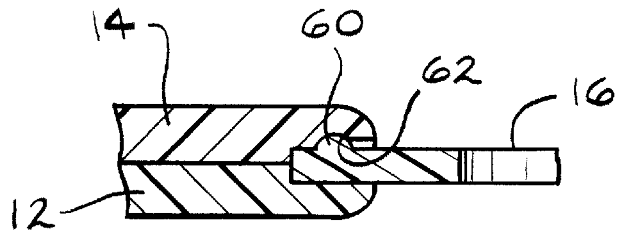
FIG. 3
FIG. 4
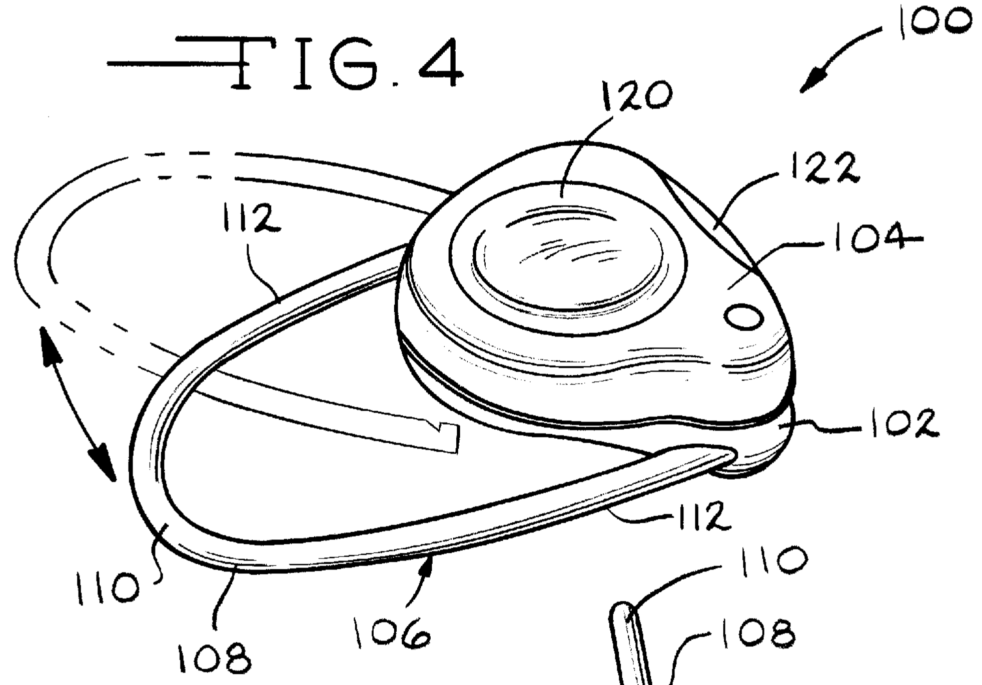
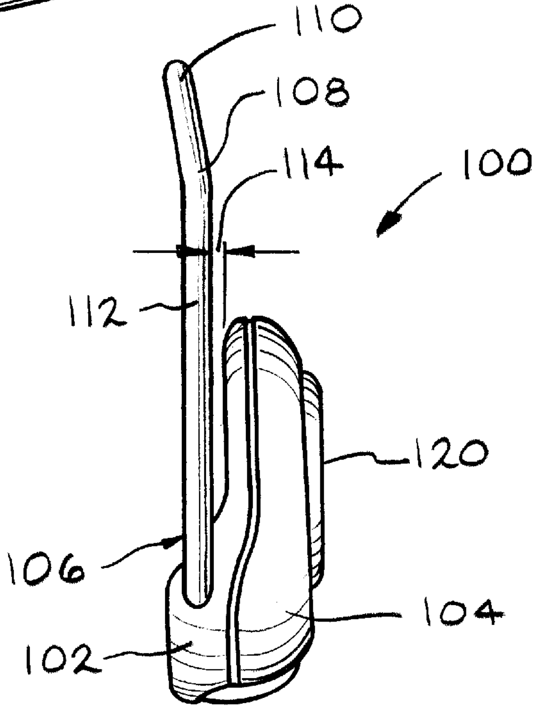
FIG. 5

KEY FOB FOR VEHICULAR REMOTE KEYLESS ENTRY SYSTEMS

BACKGROUND OF THE INVENTION

An increasingly common feature of new vehicles is remote keyless entry. The remote keyless entry system uses a relatively small transmitter housed in a portable key fob which communicates with a receiver installed in the vehicle for locking and unlocking power door, trunk, and/or liftgate locks. The key fob includes buttons or switches which correspond with controls in the transmitter to perform the intended function. Some key fobs include additional features, such as a panic switch for sounding an alarm installed in the vehicle.

Typically, a vehicle manufacture will use the same key fob for many different models of vehicle having remote keyless entry. Therefore, the key fobs for different models of vehicle can look identical even though the vehicle platforms a different. Confusion between which key fob operates which vehicle can occur when an individual or household has more than one vehicle from the same manufacturer.

Commonly, key fobs are made of a plastic housing which include an integral loop formed therein. The loop serves the purpose of retaining a separate key ring for retaining a plurality of keys. Often, this single loop is not sufficient to house the number of keys and items a consumer would like to have attached to their key fob.

SUMMARY OF THE INVENTION

This invention relates to a vehicular key fob for a vehicular remote keyless entry system. The key fob includes a main body which houses electronics for activating the remote keyless entry system. The key fob further includes first and second components, such as faceplates and/or rings having different identifying indicia. The first and second components are releasably secured to the main body, such that they can be interchanged to function as visual or tactile identifiers to avoid confusion between similar key fobs.

Various objects and advantages of this invention will become apparent to those skilled in the art from the following detailed description of the preferred embodiment, when read in light of the accompanying drawings.

BRIEF DESCRIPTION OF THE DRAWINGS

FIG. 3 is a partial sectional view of the key fob of FIG. 1.

FIG. 4 is a perspective vie of an alternate embodiment of a key fob, in accordance with the present invention.

FIG. 5 is a side view of the key fob of FIG. 4.

DETAILED DESCRIPTION OF THE INVENTION

Figure 1:
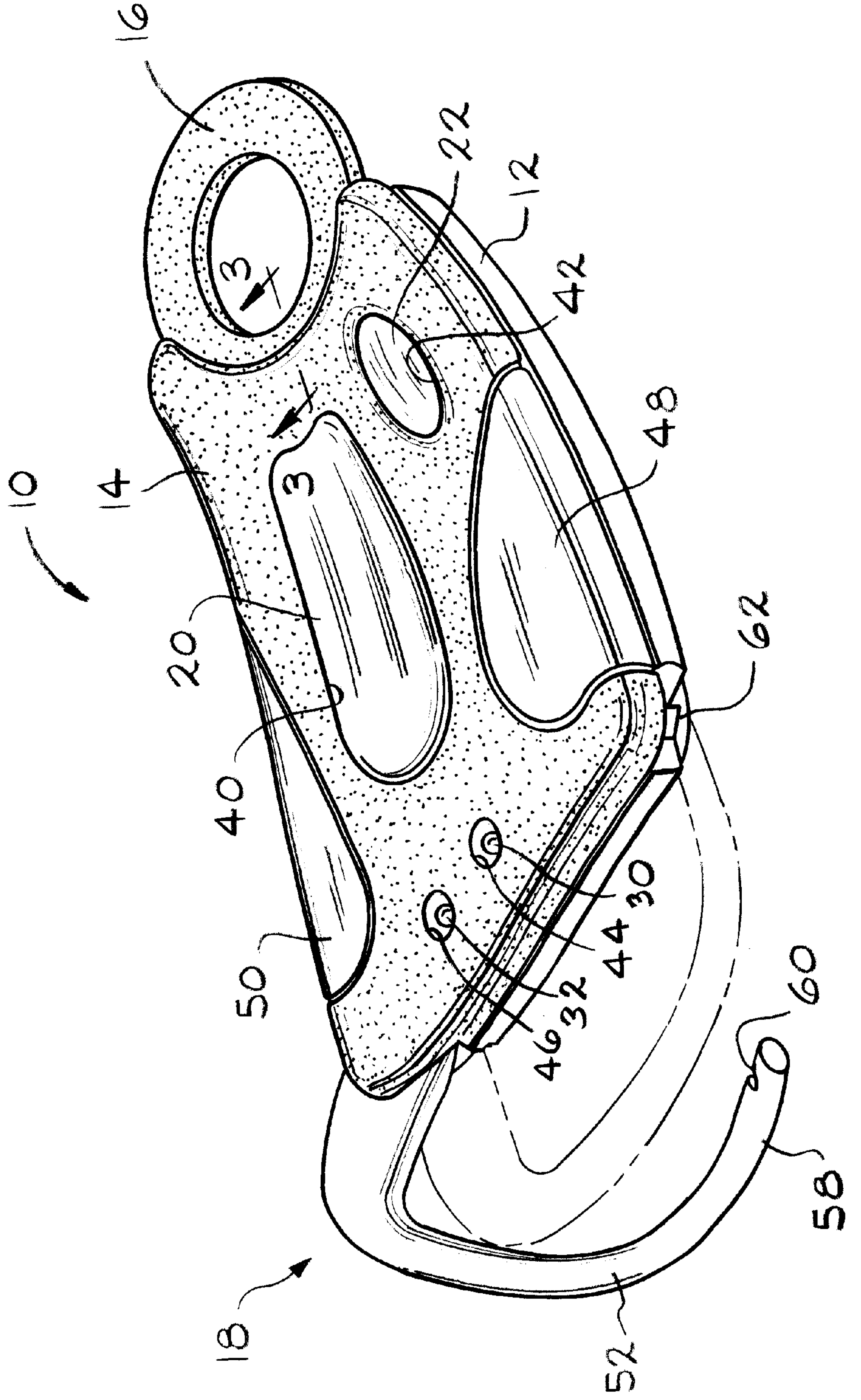
FIG. 1 is a perspective of a first embodiment of a key fob, in accordance with the present invention.

There is illustrated in FIG. 1, a first embodiment of a key fob, indicated generally at 10, in accordance with the present invention. The key fob generally includes a main body 12, a replaceable faceplate 14, a replaceable ring 16, and a latch 18.

Figure 2:
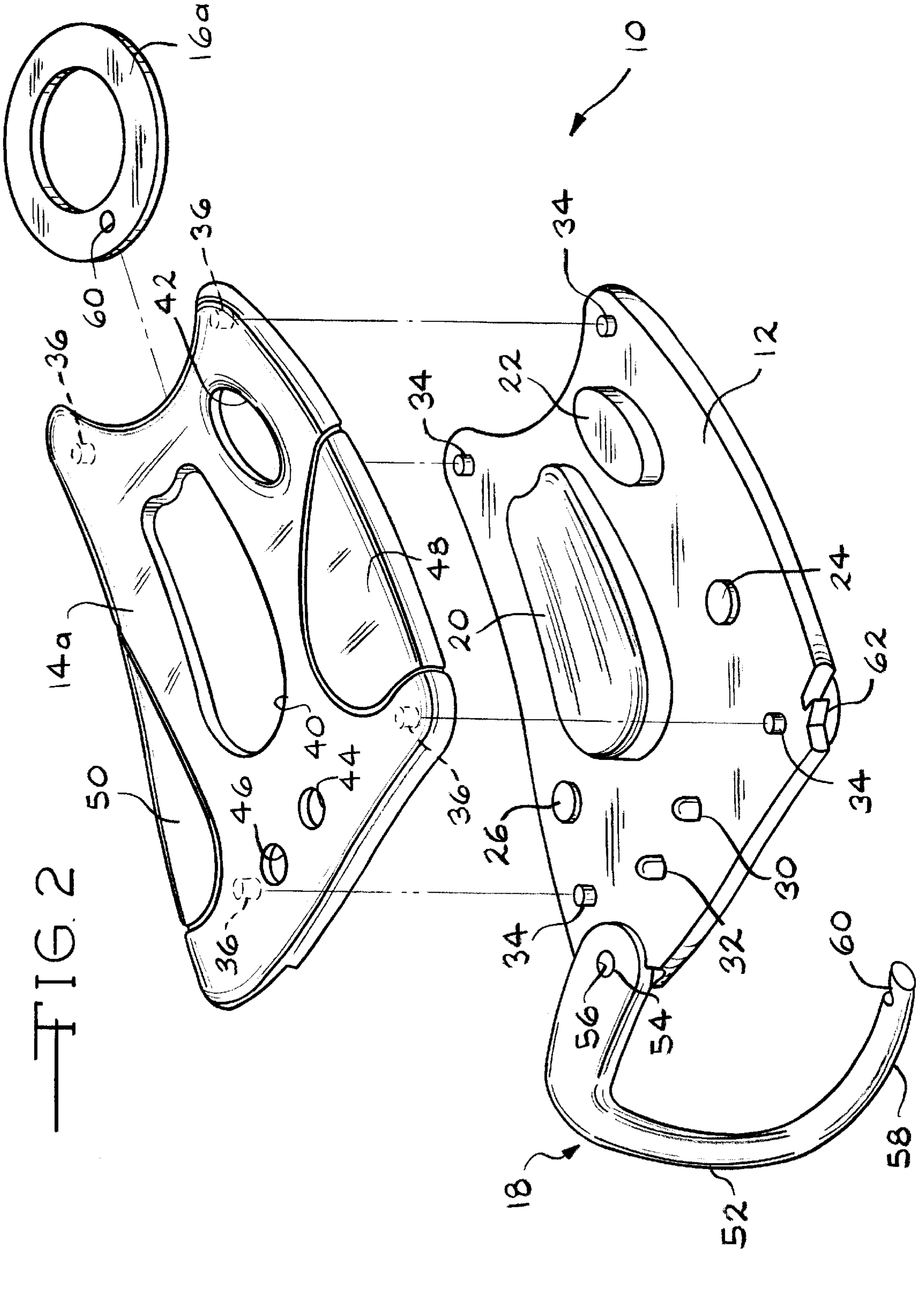
FIG. 2 is an exploded perspective view of the main body of the key fob of FIG. 1, wherein a different faceplate and ring are illustrated being attached to the main body.

There is illustrated in FIG. 2, alternate embodiments of a faceplate 14*a* and a ring 16*a*. The faceplate 14 has different indicia than the faceplate 14*a*, as indicated by the stipples on the faceplate 14 of FIG. 1 but lacking on the faceplate 14*a* of FIG. 2. Similarly, the ring 16 has different indicia than the ring 16*a*, as indicated by the stipples on the ring 16 of FIG. 1 but lacking on the ring 16*a* of FIG. 2. Examples of indicia include, color, texture, markings, and material composition. Any suitable indicia can be used which provides a visual or tactile difference therebetween. The faceplate 14 of FIG. 1 is preferably similar in structure to the faceplate 14*a* of FIG. 2, and like reference numbers will be used for similar structures and features. Likewise, the ring 16 of FIG. 1 is preferably similar in structure to the ring 16*a* of FIG. 2, and like reference numbers will be used for similar structures and features. As described below, the faceplates 14 and 14*a* and the rings 16 and 16*a* are removably attached to the main body 12 of the key fob 10. The faceplates 14 and 14*a* and/or the rings 16 and 16*a* function as replaceable components having different identifying indicia which can be used to notify the user of the key fob that they are using a particular one of multiple key fobs, each having its own different identifying indicia. For example, a household may have two vehicles where each vehicle uses a key fob 10. If both key fobs were identical, it would be difficult to initially identify which key fob relates to which vehicle. However, in accordance with the present invention, the first key fob can include the faceplate 14 and/or ring 16, and the second key fob 10 can include the faceplate 14*a* and/or ring 16*a*. The difference in the indicia provides a visual or tactile identification. It should be understood that the faceplates 14 and 14*a* and the rings 16 and 16*a* are examples of components of the key fob 12 which can be replaceable and that any suitable structure of the key 10 illustrated or not illustrated can be used as indicia identifying.

The main body 12 can be made of any suitable material, such as plastic. The illustrated embodiment of the main body 12 has a relatively flat irregularly shape having rounded features. It should be understood that the main body 12 can have any shape and size suitable for use as a portable key fob. The main body 12 houses electronics for a transmitter for a vehicle remote keyless entry system. The electronics can include electrical circuits, switches, batteries, indicator lights, and antennas. The electronics can be housed completely within the main body 12 or protrude outwardly therefrom. As best shown in FIG. 2, the main body 12 preferably includes a plurality of switches or buttons 20, 22, 24, and 26 which are connected to the electronic circuit (not shown) of the keyless entry system, as will be described in detail below. The buttons 20, 22, 24, and 26 preferably extend outwardly from the main body 12 and are preferably operated by depressing the buttons against the main body 12. The main body 12 further includes a pair of indicator lights, such as light-emitting diodes (LEDs) 30 and 32, the reason for which will be explained below.

The faceplate 14 is removably attached to the main body 12, and can be removably attached by any suitable structure. For example, as shown in FIG. 2, the main body 12 can include a plurality of attachment members 34 extending outwardly from the main body 12. The attachment members 34 frictionally engage with a plurality of recesses 36 formed in the lower surface of the faceplate 14, as viewing FIG. 2. Of course, the faceplate 14 can be removably attached to the main body 12 by any suitable manner.

The faceplate 14 preferably includes openings 40, 42, 44, and 46 for exposing the buttons 20 and 33 and the LEDs 30 and 32, respectively. The faceplate 14 can also include a pair of panels 48 and 50 flexibly attached to the faceplate 14. The panels 48 and 50 can be moved relative to the faceplate 14 to actuate the buttons 24 and 26. Although the faceplate 14, as shown in FIGS. 1 and 2 extends generally across the entire upper surface of the main body 12, the faceplate 14 could be configured to cover only a portion of the main body 12 or multiple sides of the main body 12.

The key fob 10 preferably includes the latch 18. The latch includes an arm 52 pivotally attached to the main body 12 such as by a pin 54 and socket 56. The arm 52 is preferably hook-shaped to function as a loop when engaged with the main body for retaining key, etc. The arm 52 includes an end 58 having a notch 60 formed therein which cooperates with a detent 62 formed in the main body 12 to provide a frictional engagement so that the end 58 of the arm 52 is secured to the main body 12. Of course, any suitable latch structures can be used.

As stated above, the main body 12 supports electronic elements in particular for a remote keyless entry system. The functionality of the buttons 20, 22, 24, and 26 can be individualized for the consumer. Functionality options include activating features, including but not limited to, remote keyless entry system, trunk release, panic function, door release, door lock and unlock, and vehicle locator. The functionality of the buttons 20, 22, 24, 26 in a preferred embodiment will now be described.

Actuation of the button 22 in a preferred embodiment functions as a trunk release. Actuation of the button 22 on the key fob 10 sends a signal to a signal receiving device (not shown) on the trunk latch of the vehicle (not shown). The received signal initiates a movement of the trunk latch, allowing access to the trunk compartment.

Actuation of the button 24 via the panel 48 in a preferred embodiment functions as a car locator. Actuation of the button 24 sends a signal to a signal receiving device (not shown) on the vehicle (not shown). In response, a device (not shown) on the vehicle sends a signal to the key fob 10. An electronic portion (not shown) of the key fob 10 processes the signal received from the device on the vehicle and initiates an activation pattern for the LEDs 30 and 32 of the key fob 10. The activation pattern of the LEDs 30 and 32 indicates the location of the automobile with respect to the key fob 10. For example, when the panel 48 is pressed, the button 24 is activated. If the automobile is located in leftward direction of the key fob 10 in a certain orientation, the LED 30 of the key fob 10 lights or flashes in a distinctive pattern. If the automobile is located to the right of the key fob 10, the LED 32 of the key fob 10 lights or flashes in a different distinctive pattern.

In another embodiment, the key fob 10 can include a liquid crystal display (LCD) (not shown) in addition to or in lieu of the LEDs 30 and 32. In such an embodiment, when the panel 48 is pressed, the LCD, with or without the LEDs 30 and 32, indicates the location of the automobile with respect to the key fob 10. The LCD might also provide a map or directions to indicate the location of the automobile.

Actuation of the button 26 in a preferred embodiment functions as a panic button. When the panel 50 is pressed, the button 26 is activated. Actuation of the button 26 on the key fob 10 sends a signal to a signal receiving device (not shown) on the vehicle (not shown). The received signal results in an alert signal, such as a loud noise and/or bright light from the vehicle. The signal is preferably emitted from the vehicle but may be emitted from the key fob 10 or another structure.

Actuation of the button 20 in a preferred embodiment functions as an automobile door lock activator. Actuation of the button 20 sends a signal to a signal receiving device (not shown) on a door lock assembly (not shown). The received signal results in a vehicle door or plurality of doors being locked or unlocked. The button 20 can be depressed once, sequentially, or under a required duration of time to perform various lock and unlocking features.

The ring 16, as well as the ring 16*a*, is preferably a contiguous circular band and can be used for the storage of keys or other components, such as flashlights, pocket knives, etc. As shown in FIGS. 2 and 3, the ring 16 includes a raised portion 60 which receivably mates with a notch 62 formed in the faceplate 14, thereby providing a frictional fit. Of course, the ring 16 can be removably attached to the key fob 10 by any suitable manner.

There is illustrated in FIGS. 4 and 5, an alternate embodiment of a key fob, indicated generally at 100. The key fob 100 can incorporate any of the features of the key fob 10 described above and shown in FIGS. 1 through 3. The key fob 100 preferably includes a main body 102 and a removable faceplate 104 which is preferably readily removable for ease of customization with identifying indicia for the consumer.

The key fob 100 also preferably includes a latch 106, similar in structure as the latch 18 of the key fob 10. The latch 106 includes an arm 108 preferably in the form of a U-shaped hook having a central portion 110 connecting a pair of co-planar legs 112. As shown in FIG. 5, the legs 112 are preferably spaced from a portion of the main body 102 to form a gap 114. The gap 114 permits the key fob 100 to be placed on a strip of material, such as clothing of a shirt or pants pocket, so that the material is sandwiched between the main body 102 and the legs 112. The central portion 110 of the arm 108 can be bent outwardly, as shown in FIG. 5, for ease of insertion of the key fob 110 into the strip of material.

The key fob 110 preferably includes a button 120 provided in the faceplate 104, and a button 122 provided between the faceplate 104 and the main body 102. The functionality of the buttons 120 and 122 can be similar to the functionality of any one of the buttons 20, 22, 24, and 26 of the key fob 10.

The principle and mode of operation of this invention have been described in its preferred embodiments. However, it should be noted that this invention may be practiced otherwise than as specifically illustrated and described without departing from its scope.

What is claimed is:

1. A key fob for a vehicular remote keyless entry system comprising:

a main body including electronics for activating a remote keyless entry system; and a removable first component having identifying indicia, said component being releasably secured to the main body such that it can be replaced with a similarly shaped second component having different identifying indicia than said indicia of said first component.

2. The key fob of claim 1, wherein one of said identifying indicia is the color of said first and second components.

3. The key fob of claim 1, wherein one of said identifying indicia is the texture of the material of said first and second components.

4. The key fob of claim 1, wherein one of said identifying indicia is the material composition of said first and second components.

5. The key fob of claim 1, wherein said first and second components are rings releasably attached to said main body.

6. The key fob of claim 1, wherein said first and second components are faceplates for covering a portion of said main body.

7. The key fob of claim 6, wherein said faceplates include openings formed therein, and wherein said main body includes electrical switches extending outwardly therefrom disposed in said openings of said faceplates when said faceplates are secured on said main body.

8. The key fob of claim 1 further including a latch mechanism movable between an open and a closed position.

9. The key fob of claim 8, wherein said latch includes a U-shaped member having a pair of co-planar sections spaced from a surface of said main body to form a gap.

* * * * *